May 3, 1949.  W. F. SCOTT  2,469,280
VOLTAGE REGULATOR TUBE CIRCUIT
Filed April 18, 1946
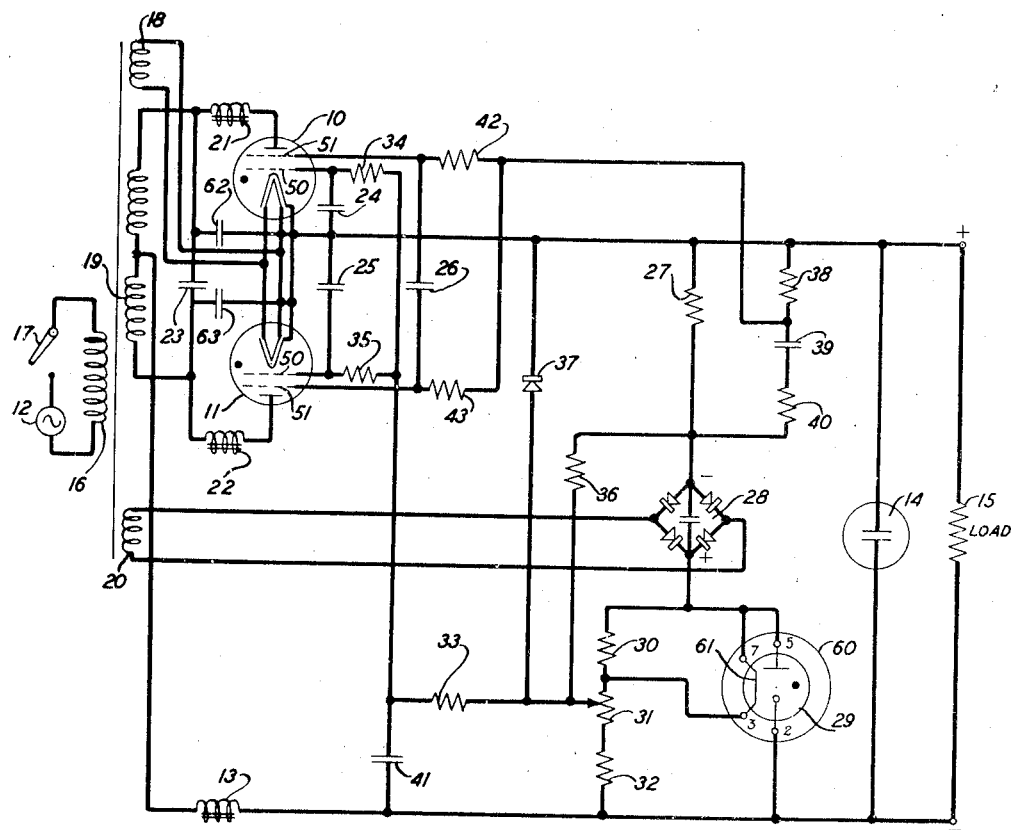
INVENTOR
W. F. SCOTT
BY
*G. J. Heuerman*
ATTORNEY Patented May 3, 1949

2,469,280

UNITED STATES PATENT OFFICE 2,469,280

VOLTAGE REGULATOR TUBE CIRCUIT

Walter F. Scott, Millburn, N. J., assignor to Bell Telephone Laboratories, Incorporated, New York, N. Y., a corporation of New York Application April 18, 1946, Serial No. 662,951

4 Claims. (Cl. 323—17)

This invention relates to current supply apparatus and particularly to a regulated rectifier for supplying rectified current to a load.

An object of the invention is to provide in a current supply circuit protective means for preventing excessively high voltage across a load.

Another object of the invention is to provide a voltage regulating circuit which may be modified for changing the voltage across a load while the circuit is in operation without permitting the load voltage to rise to an excessively high value while the circuit is being modified.

In a specific regulated rectifier herein shown and described for the purpose of illustration, there is provided for supplying rectified current to a load a main rectifier employing two space discharge rectifier tubes, each having an anode, a cathode and two control electrodes, these devices preferably being of the gas-filled type. There is connected across the load a shunt current path comprising an auxiliary rectifier, a resistor for connecting the negative terminal of the auxiliary rectifier to the positive load terminal, that is to the cathodes of the main rectifying tubes, and a cold cathode, gas-filled, constant voltage tube one terminal of which is connected to the positive terminal of the auxiliary rectifier and the other terminal of which is connected to the negative load terminal. The cold cathode tube is shunted by a resistive path comprising a potentiometer the adjustable tap of which is connected to the control electrode of each tube of the main rectifier. The potentiometer tap is also connected to the positive load terminal through an asymmetrically conducting element or varistor. Varistors are described in an article by J. A. Becker on page 322 et seq. of "Bell Laboratories Record" for July 1940. The varistor is so poled in the circuit that, when the main rectifier tubes are non-conducting, current from the auxiliary rectifier flows through the varistor in its forward or low resistance direction to make the control grid of each rectifier tube positive with respect to its cathode by only a few volts.

Conduction in the main rectifier tubes may be readily prevented by applying a negative potential to the screen grid of each tube relative to the cathode potential. For preventing conduction in the main rectifier tubes during an initial period in which the cathodes of the tubes are being heated to operating temperature and thus avoiding damaging the cathodes, there is provided a current path having a condenser and a resistor in series connecting the positive load terminal to the negative terminal of the auxiliary rectifier, one terminal of the resistor being connected to the screen grid of each of the main rectifying tubes. As the condenser is charged by current from the auxiliary rectifier through the circuit comprising the relatively low forward resistance of the varistor, there is thus supplied to the screen grid with respect to the cathode an exponentially decreasing negative biasing potential to cause conduction to be initiated in the rectifier tubes after a delay period determined by the time constant of the condenser charging circuit. The charging of the condenser continues after conduction in the rectifier tubes is initiated to cause the load voltage to increase gradually. As the load voltage increases, the voltage across the cold cathode tube also increases until its breakdown voltage is reached. The voltage across the cold cathode tube is then maintained substantially constant. In case of short power interruptions such that the cathodes of the main rectifier tubes remain heated to some extent, a charge will remain on the condenser at the time that power is restored with the result that the delay period is correspondingly reduced.

During normal operation, the potential applied to the control electrode of each rectifier tube relative to the cathode potential is equal to the difference between the load voltage and a portion at least of the substantially constant voltage across the cold cathode tube so that voltage changes across the load are minimized. Under this normal operating condition the current flow through the varistor is in its reverse or high resistance direction so that the varistor does not interfere with the operation of the voltage regulating control circuit. A condenser is provided in a path connecting the screen grid of one of the rectifier tubes with the screen grid of the other tube. Current flowing in the rectifier tube which is conducting at a particular time charges the condenser so as to impress a negative potential upon the screen grid of the second tube prior to the starting of conduction therein. Each screen grid is thus maintained at such a potential relative to the cathode potential that conduction in each tube may be controlled effectively in response to load voltage changes.

A series resistor is included in the resistive path which shunts the cold cathode tube. When the cold cathode tube is in its socket during normal operation, the resistor is short-circuited by a low resistance current path including a conductor in the base of the cold cathode tube. When the cold cathode tube is removed from its socket, therefore, the short-circuiting path is opened to increase the resistance of the shunt current path.

The load voltage is thereby limited to a safe maximum value.

The cold cathode tube may thus be removed while the circuit is in operation so as to avoid interruption of the load voltage. The load voltage may be changed by removing the cold cathode tube from its socket and replacing it by another cold cathode tube having different operating characteristics. A wide range of load voltages may thus be obtained.

The single figure of the drawing is a schematic view of a regulated rectifier embodying the invention.

Referring to the drawing, there is shown a main rectifier comprising gas-filled, space discharge rectifier tubes 10 and 11, each having an anode, a cathode, a control grid 50 and a screen grid 51, for rectifying current from an alternating current source 12 and for supplying the rectified current through a ripple filter comprising series inductance element 13 and 600-microfarad electrolytic condenser 14 to a load 15. The rectifier tubes may be of the RCA JAN2050 type for example. There is provided a transformer having a primary winding 16 to which current from source 12 is supplied when the switch 17 is closed and secondary windings 18, 19 and 20. A 1-microfarad filter condenser 23 is connected across winding 19. Current is supplied to the cathode heater of tubes 10 and 11 from transformer winding 18. The end terminals of transformer winding 19 are connected to the anodes of tubes 10 and 11, respectively, through inductance coils 21 and 22, respectively, and the mid-terminal of winding 19 is connected through inductance element 13 to the negative load terminal. The cathodes and cathode heaters of tubes 10 and 11 are connected to the positive load terminal. A 0.001-microfarad condenser 62 is provided in a path connecting the common terminal of winding 19 and inductance coil 21 to the cathode of tube 10 and a similar condenser 63 is provided in a path connecting a common terminal of winding 19 and inductance coil 22 to the cathode of tube 11. A 0.006-microfarad condenser 24 is provided in a path connecting the control electrode 50 of tube 10 to its cathode and a similar condenser 25 is provided in a path connecting the control electrode 50 of tube 11 to its cathode. The screen grids 51 of tubes 10 and 11 are connected by a path comprising a 0.5-microfarad condenser 26.

There is connected across the load a shunt current path comprising in series a resistor 27 of 5,400 ohms, one terminal of which is connected to the positive load terminal, an auxiliary rectifier 28 of the varistor-bridge type having its negative output terminal connected to a terminal of resistor 27 and a cold cathode, gas-filled constant voltage tube 29 which is inserted in a socket 60. One terminal of the tube 29 is connected to the positive terminal of auxiliary rectifier 28 and the other terminal of the tube is connected to the negative load terminal. Across the terminals of tube 29 are connected in series a 100,000-ohm resistor 30, a 25,000-ohm potentiometer 31 and a 68,000-ohm resistor 32. In normal operation resistor 30 is short-circuited by a path including a conductor 61 in the base of the tube 29. The adjustable tap of potentiometer 31 is connected through 0.22-megohm resistor 33 and 47,000-ohm resistor 34 in series to the control grid of tube 10 and through resistor 33 and 47,000-ohm resistor 35 to the control grid of tube 11. There is provided a resistor 36 of 15,000 ohms in a path connecting the adjustable tap of potentiometer 31 to the negative terminal of auxiliary rectifier 28. There is provided an asymmetrically conducting device or varistor 37 of the copper oxide type in a path connecting the adjustable tap of potentiometer 31 to the positive load terminal. The varistor is so poled that when tubes 10 and 11 are non-conducting current from auxiliary rectifier 28 flows through varistor 37 in its forward or low resistance direction under which condition the varistor has a resistance of about 700 ohms. During normal operation when tubes 10 and 11 are conducting current flows through varistor 37 in the reverse or high resistance direction under which condition the resistance of the varistor is about 85,000 ohms. There is connected across resistor 27 a path comprising in series 3.9-megohm resistor 38, one terminal of which is connected to the positive load terminal, a 4-microfarad condenser 39 and a 0.1-megohm resistor 40, one terminal of which is connected to the negative output terminal of rectifier 28. Alternating current is supplied to auxiliary rectifier 28 from transformer winding 20. A condenser 41 of 0.2-microfarad connects the common terminal of resistors 33, 34 and 35 to the negative load terminal. The common terminal of resistor 38 and condenser 39 is connected through 47,000-ohm resistor 42 to the screen grid of tube 10 and through 47,000-ohm resistor 43 to the screen grid of tube 11.

When switch 17 is closed to start the circuit in operation, heating current is supplied to the cathodes of tubes 10 and 11 and current is supplied to auxiliary rectifier 28. Rectified current from auxiliary rectifier 28 flows through a circuit comprising in series resistor 30, a portion of the winding of potentiometer 31, varistor 37 and resistor 27. The resistance of varistor 37 being relatively low for this direction of current flow, the current in this circuit is of such magnitude that there is set up across resistor 27 an electromotive force of about 30 volts. Charging current is thus supplied to condenser 39. At the time that charging current commences to flow, the voltage drop across resistor 38 is about 29 volts. This voltage across resistor 38 which decreases exponentially with time biases the screen grids of tubes 10 and 11 negatively with respect to the cathodes of the tubes to prevent conduction of space current in tubes 10 and 11 during an initial starting period while the cathodes of the tubes are being heated to operating temperature, thus preventing damaging the cathodes. The varistor 37 is in the circuits connecting the control grids 50 of tubes 10 and 11, respectively, with the cathodes of the tubes. However, because of the low forward resistance of varistor 37, the positive biasing potential applied to the grids 50 is only about 4 volts so that the negative bias on grids 51 of tubes 10 and 11 due to the voltage drop across resistor 38 is sufficient to prevent conduction of space current in the tubes.

When the voltage drop across resistor 38 has decreased from about 29 volts to approximately 11 volts in a period of about 17 seconds from a cold start, tubes 10 and 11 commence to pass space current. After the tubes become conducting the negative potential of screen grids 51 continues to decrease to cause the space current supplied to the load to increase gradually. About 2 seconds after tubes 10 and 11 start passing space current, the normal load voltage is reached. The rate of increase of current supplied to the load, and, therefore, of the load voltage is dependent upon the rate of further charging of condenser 39. Most of the charging current during this period is due to the screen grid current, that is the current which flows through a circuit from the anode to the screen grid of each of tubes 10 and 11 and thence through condenser 39, resistor 40, rectifier 28, tube 29, and filter inductance element 13 to the mid-tap of transformer 19.

When the sum of the load voltage and the output voltage of auxiliary rectifier 28 reaches a sufficiently high value, the voltage across cold cathode tube 29 causes the tube to become conducting and thereafter the voltage across the tube is maintained at a substantially constant value. Moreover, during normal operation the load voltage is sufficiently high to cause current to flow through varistor 37 in its reverse or high resistance direction, its resistance being about 85,000 ohms for this condition. Because of its high resistance the varistor 37 has a negligible shunting effect upon the voltage controlling circuit connecting the control electrodes 50 and the cathodes of tubes 10 and 11 and it therefore does not interfere with the operation of the regulating circuit. The control voltage in the circuit connecting the control grid 50 and the cathode of each of tubes 10 and 11 is equal to the voltage across load 15 and a voltage of opposite polarity across resistor 32 and a portion of potentiometer 31 in series. If the load voltage should rise by a small amount, for example, the resultant control voltage changes in a direction to make the control grids 50 relatively more negative with respect to the cathode potential of tubes 10 and 11. The increase in load voltage is thus minimized. The voltage across resistor 32 and, in series therewith, the lower portion of potentiometer 31, as viewed in the drawing is substantially constant when the output voltage of auxiliary rectifier 28 is constant. However, when the output voltage of auxiliary rectifier 28 increases, for example, the current flowing in the circuit comprising the upper portion of potentiometer 31 and resistor 36 increases to cause an increase of the voltage drop across the upper portion of potentiometer 31. Since the voltage drop across cold cathode tube 29 is substantially constant, the voltage drop across resistor 32 and the lower portion of potentiometer 31 decreases. Therefore when the output voltage of auxiliary rectifier 28 increases due to an increase in line voltage 12, the control grids of tubes 10 and 11 are made relatively more negative thus tending to prevent a rise of load voltage as a result of the increase of line voltage.

When condenser 39 is fully charged no current flows through resistor 38 so that, if the voltage drop across resistor 38 were the only source of biasing potential for the screen grids 51 during normal operation, the screen grids 51 would have zero bias with respect to the cathodes. However, when tube 10 for example is conducting space current, there is a current flow in a circuit comprising the path between the anode and screen grid 51 of tube 10 through condenser 26, from the screen grid 51 of tube 11 to the cathode and thence through the load and filter inductance element 13 to the center tap of transformer winding 19. Condenser 26 is thus charged in a direction to bias screen grid 51 of tube 11 negatively with respect to the cathode. Each screen grid 51 is thus maintained about 1 volt negative with respect to the cathodes during the non-conducting period so as to avoid interference with the starting of conduction in each tube during the positive half cycle of the anode voltage under control of the voltage in the control circuit connecting the grid 50 and the cathode of each tube. If the line voltage should be interrupted for a relatively brief period such that the cathodes of tubes 10 and 11 remain heated but below normal operating temperature, a charge will remain on condenser 39. The delay period intervening between the restoration of the line voltage and the starting of conduction in tubes 10 and 11 is therefore correspondingly reduced.

It will be observed that the upper terminal of resistor 30 is connected to terminals 5 and 7 of the socket 60, that the lower terminal of resistor 30 is connected to terminal 3 of the socket and that the negative load terminal is connected to terminal 2 of the socket 60. Terminals 3 and 7 are conductively connected by a path including a conductor 61 provided in the base of tube 29. If desired, of course, resistor 30 could be moved to a different portion of the shunt current path. For example, it could be connected in the shunt current path between a terminal of resistor 27 and the negative terminal of auxiliary rectifier 28. Terminals 3 and 7 of the socket 60, of course, would be connected to the terminals, respectively, of resistor 30. With tube 29 in its socket, therefore, resistor 30 is short-circuited, the anode of the tube is connected to the upper terminal of potentiometer 31 and the cathode of the tube is connected to the lower terminal of resistor 32. When the tube 29 is removed from socket 60, if resistor 30 remained short-circuited the current through potentiometer 31 and resistor 32 would increase to make the control grids of tubes 10 and 11 relatively less negative and as a result increased current would be supplied to load 15. Under these conditions, if the load were relatively light, the load voltage would reach an excessively high value, say 200 volts. This voltage may equal or exceed the maximum voltage rating of electrolytic condenser 14. Effectively inserting resistor 30 in the circuit by removing the short circuit across it when tube 29 is removed from its socket, limits the current in the circuit including potentiometer 31 and resistor 32, thereby preventing the load voltage from rising above the normal maximum voltage of about 150 volts for which the circuit was designed. A wide range of load voltages may be obtained without interrupting the voltage across the load by removing a tube 29 from socket 60 and inserting a voltage regulator tube having a different characteristic. Tubes which may be used are RCA VR-150, VR-105 and VR-90, for example. With any of these tubes in socket 60 the load voltage may be further varied by changing the setting of the adjustable tap of potentiometer 31. In this manner the load voltage may be varied over a range of values from about 90 to 150 volts. For any selected voltage, the circuit operates to minimize load voltage changes due to load changes or to changes of supply voltage.

What is claimed is:

1. The combination, with means for supplying current from a current supply source to a load, of means for minimizing voltage changes across said load comprising a shunt current path connected across said load, said shunt current path comprising ohmic resistance, a cold cathode constant voltage tube having a space current path and a conductor, a socket for said tube, means including said conductor for completing a short-circuiting path across a first portion of said ohmic resistance and means for connecting said space current path across another portion of said ohmic resistance to cause current to flow through said space current path, said tube being removable from its socket to open said short-circuiting path and to simultaneously interrupt the current flow through said space current path whereby said first portion of said ohmic resistance limits the current through said other portion of said ohmic resistance when said tube is removed.

2. In combination, means for supplying current from a current supply source to a load including in series with the load with respect to the source the space current path of a space current device having an anode, a cathode and a control electrode, the cathode of said device being connected to the positive load terminal, a shunt current path connected across said load comprising in series a first and a second ohmic resistance means, a constant voltage device having a space current path and having two terminals and a conductor for connecting said two terminals, means including said conductor for completing a short-circuiting path across a portion of said first resistance means, means for connecting said space current path across said second resistance means and a circuit connecting the control electrode and cathode of said space current device comprising said load and a portion at least of said second ohmic resistance means, thereby maintaining the load voltage at a substantially constant value determined in part at least by the operating characteristics of said constant voltage device when said device is operatively connected in said shunt current path and limiting the load voltage when said constant voltage device is removed from said shunt current path.

3. In combination, current control means responsive to a control voltage having variations corresponding to load voltage changes for controlling the current supplied from a current source to a load to cause load voltage changes to be minimized, a device having a space current path the resistance of which changes in response to a change of current flowing therethrough, and means for setting up said control voltage comprising a shunt current path connected across said load, said shunt current path comprising ohmic resistance and the space current path of said device, said space current path being connected across a first portion of said ohmic resistance, said device having a conductor for completing a short-circuiting path across another portion of said ohmic resistance, said device being removable for disconnecting said space current path from said shunt current path and for simultaneously opening said short-circuiting path, whereby said other portion of said ohmic resistance limits the current through said first portion when said device is removed.

4. The combination with voltage responsive means for controlling the supply of current from a current supply source to a load, of a device comprising a conductor and a resistance means the resistance of which changes in response to change of current flowing therethrough, a shunt current path connected across said load, said shunt current path comprising ohmic resistance, said conductor and said resistance means, said resistance means being connected across a first portion of said ohmic resistance, said conductor being connected across a second portion of said ohmic resistance, and means for setting up for controlling said voltage responsive means a control voltage having as a component the voltage across a part, at least, of said first portion of said ohmic resistance, said device being removable for disconnecting simultaneously said conductor and said resistance means from said shunt current path, whereby said second portion of said ohmic resistance limits the current through said first portion when said device is removed.

WALTER F. SCOTT.

REFERENCES CITED

The following references are of record in the file of this patent:

UNITED STATES PATENTS

| Number | Name | Date |
| --- | --- | --- |
| 1,921,461 | Garstand | Aug. 8, 1933 |
| 2,084,509 | Seidelbach | June 22, 1937 |
| 2,197,426 | Del Camp | Apr. 16, 1940 |
| 2,416,922 | Irish | Mar. 4, 1947 |